United States Patent
Benedict et al.

(10) Patent No.: US 10,161,495 B2
(45) Date of Patent: Dec. 25, 2018

(54) CONTROLLED RELATIVE RADIUS OF CURVATURE FORGED BEVEL GEARS WITH INVOLUTE SECTION

(71) Applicant: American Axle & Manufacturing, Inc., Detroit, MI (US)

(72) Inventors: Dale K. Benedict, Commerce Township, MI (US); Yevsey Gutman, Minneapolis, MN (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 397 days.

(21) Appl. No.: 15/044,159

(22) Filed: Feb. 16, 2016

(65) Prior Publication Data

US 2016/0160987 A1  Jun. 9, 2016

Related U.S. Application Data

(62) Division of application No. 13/160,801, filed on Jun. 15, 2011, now Pat. No. 9,267,594.

(Continued)

(51) Int. Cl.
*F16H 55/08* (2006.01)
*B21K 1/30* (2006.01)
(Continued)

(52) U.S. Cl.
CPC .......... *F16H 55/0813* (2013.01); *B21J 13/02* (2013.01); *B21K 1/30* (2013.01);
(Continued)

(58) Field of Classification Search
CPC . B21K 1/30; B23P 15/14; F16H 48/08; F16H 55/20; F16H 55/22; F16H 55/08; F16H 55/0806

See application file for complete search history.

(56) References Cited

U.S. PATENT DOCUMENTS

| | | | | |
|---|---|---|---|---|
| 1,454,508 A | * | 5/1923 | Eckert | B21K 1/30 29/893.34 |
| 1,694,027 A | * | 12/1928 | Wildhaber | F16H 55/0813 74/459.5 |

(Continued)

OTHER PUBLICATIONS

Engineering Update: Low Stress Gearing Takes a New Shape—Article reprinted from the Sep. 1981 issue of "Design Engineering."

*Primary Examiner* — Zakaria Elahmadi
(74) *Attorney, Agent, or Firm* — Harness, Dickey & Pierce, P.L.C.

(57) ABSTRACT

Mating bevel gears generally include a pinion gear having a body that rotates about an axis and a side gear having a body that rotates about an axis that intersects the axis of the pinion gear. Pinion gear teeth of the pinion gear have a side that defines a curvature with an involute section through which a pitch line extends and a parabolic shape between the pinion gear teeth. Side gear teeth of the side gear have a side that defines a curvature with an involute section through which a pitch line extends and a parabolic shape between the side gear teeth. The curvatures on the pinion and the side gear teeth cooperatively define a controlled relative radius of curvature section except where the involute sections are located. The controlled relative radius of curvature section defines a sum of values of radius of curvature at a point of contact between the curvatures of the pinion gear teeth and the side gear teeth. The sum has a constant or decreasing value.

20 Claims, 14 Drawing Sheets

Related U.S. Application Data

(60) Provisional application No. 61/376,444, filed on Aug. 24, 2010.

(51) Int. Cl.
  *B23P 15/14* (2006.01)
  *B21J 13/02* (2006.01)
  *B23P 15/24* (2006.01)
  *F16H 55/17* (2006.01)
  *G05B 19/18* (2006.01)

(52) U.S. Cl.
  CPC .............. *B23P 15/14* (2013.01); *B23P 15/24* (2013.01); *F16H 55/17* (2013.01); *G05B 19/182* (2013.01); *G05B 2219/35044* (2013.01); *G05B 2219/36198* (2013.01); *Y10T 29/49474* (2015.01); *Y10T 74/19958* (2015.01); *Y10T 83/0259* (2015.04)

(56) References Cited

U.S. PATENT DOCUMENTS

| | | | |
|---|---|---|---|
| 2,009,915 A * | 7/1935 | Davis | F16H 55/0846 475/236 |
| 2,285,575 A | 6/1942 | Elbertz | |
| 2,393,628 A * | 1/1946 | Goldie | B21J 5/02 29/893.34 |
| 2,713,277 A | 7/1955 | Kaul | |
| 2,808,732 A * | 10/1957 | Champion, Sr. | F16H 55/08 74/462 |
| 2,964,838 A | 12/1960 | Schober | |
| 3,251,236 A * | 5/1966 | Wildhaber | F16H 55/0826 74/462 |
| 3,631,736 A | 1/1972 | Saari | |
| 3,832,763 A | 9/1974 | Schober | |
| 4,108,017 A * | 8/1978 | Rouverol | F16H 55/08 74/462 |
| 4,273,002 A * | 6/1981 | Ogasawara | F16H 1/12 74/416 |
| 4,276,785 A | 7/1981 | Rouverol | |
| 4,280,376 A | 7/1981 | Rosen | |
| 4,586,167 A | 4/1986 | Fujishima et al. | |
| 4,644,814 A * | 2/1987 | Rouverol | F16H 55/0806 74/457 |
| 4,651,588 A * | 3/1987 | Rouverol | F16H 55/0806 74/462 |
| 4,709,569 A | 12/1987 | Sabroff et al. | |
| 4,899,609 A | 2/1990 | Nagata | |
| 5,083,474 A | 1/1992 | Rouverol | |
| 5,255,475 A | 10/1993 | Kotthaus | |
| 5,271,289 A * | 12/1993 | Baxter, Jr. | F16H 55/08 29/893 |
| 5,605,518 A * | 2/1997 | Kogure | F16H 1/28 475/344 |
| 5,718,774 A | 2/1998 | Tukamoto et al. | |
| 5,867,901 A | 2/1999 | Noda et al. | |
| 6,101,892 A * | 8/2000 | Berlinger, Jr. | F16H 55/08 74/462 |
| 6,112,611 A | 9/2000 | Maki | |
| 6,128,969 A | 10/2000 | Litvin et al. | |
| 6,178,840 B1 * | 1/2001 | Colbourne | F16H 55/08 74/421 R |
| 6,230,578 B1 | 5/2001 | Kim et al. | |
| 6,302,356 B1 | 10/2001 | Hawkins | |
| 6,324,931 B1 | 12/2001 | Tsung | |
| 6,335,503 B1 | 1/2002 | Tsung | |
| 6,467,375 B1 | 10/2002 | Ishikawa | |
| 6,543,569 B1 | 4/2003 | Shimizu et al. | |
| 6,571,655 B2 * | 6/2003 | Tanaka | F16H 55/0806 74/457 |
| 6,682,456 B2 | 1/2004 | Allen et al. | |
| 6,837,123 B2 * | 1/2005 | Hawkins | F16H 55/08 74/457 |
| 6,964,210 B2 * | 11/2005 | Colbourne | B23F 15/00 407/20 |
| 7,077,026 B2 | 7/2006 | Colbourne | |
| 7,171,907 B2 | 2/2007 | Early | |
| 7,191,521 B2 | 3/2007 | Litvin et al. | |
| 7,926,381 B2 * | 4/2011 | Grosskopf | F16H 55/0806 310/83 |
| 8,061,229 B2 * | 11/2011 | Zhuravlev | F16H 55/08 74/457 |
| 8,424,408 B2 * | 4/2013 | Zsolt | F16H 55/0806 74/457 |
| 2002/0134184 A1 * | 9/2002 | Hawkins | F16H 55/08 74/457 |
| 2009/0064812 A1 * | 3/2009 | Gutmann | F16H 55/08 74/462 |
| 2009/0165585 A1 * | 7/2009 | Zhuravlev | F16H 55/08 74/462 |
| 2013/0186225 A1 * | 7/2013 | Okamoto | F16H 55/0806 74/462 |

\* cited by examiner

CONTROLLED RELATIVE RADIUS OF CURVATURE FORGED BEVEL GEARS WITH INVOLUTE SECTION

CROSS-REFERENCE TO RELATED APPLICATIONS

This application is a divisional of U.S. application Ser. No. 13/160,801, filed Jun. 15, 2011 (now U.S. Pat. No. 9,267,594 issued Feb. 23, 2016), which claims the benefit of U.S. Provisional Patent Application No. 61/376,444 filed Aug. 24, 2010, entitled "Controlled Relative Radius of Curvature Forged Bevel Gears With Involute Section", the disclosure of which is incorporated by reference as if set forth in its entirety herein.

FIELD

The present teachings relate to forged mating bevel gears having a controlled relative radius of curvature section and an involute section.

BACKGROUND

Spur gear teeth with an involute profile on a typical pair of parallel axis drive gears have reduced sensitivity to centering distance between the parallel axes. The contact stress of the spur gear teeth, however, increases from the pitch circle toward the top and bottom lands. Spur gear teeth on the typical pair of parallel axis gears with a constant relative radius of curvature section have a relatively constant contact stress from the pitch circle toward the top land and the bottom land but have increased sensitivity to centering distance of the parallel axes.

SUMMARY

This section provides a general summary of the disclosure and is not a comprehensive disclosure of its full scope or all of its features.

The present teachings generally include mating bevel gears. The mating bevel gears include a pinion gear having a body that rotates about an axis and a side gear having a body that rotates about an axis that intersects the axis of the pinion gear. Pinion gear teeth of the pinion gear have a side that defines a curvature with an involute section through which a pitch line extends and a parabolic shape between the pinion gear teeth. Side gear teeth of the side gear have a side that defines a curvature with an involute section through which a pitch line extends and a parabolic shape between the side gear teeth. The curvatures on the pinion and the side gear teeth cooperatively define a controlled relative radius of curvature section except where the involute sections are located. The controlled relative radius of curvature section defines a sum of values of radius of curvature at a point of contact between the curvatures of the pinion gear teeth and the side gear teeth. The sum has a constant or decreasing value.

Further areas of applicability will become apparent from the description provided herein. The description and specific examples in this summary are intended for purposes of illustration only and are not intended to limit the scope of the present teachings.

DRAWINGS

Figure 4:
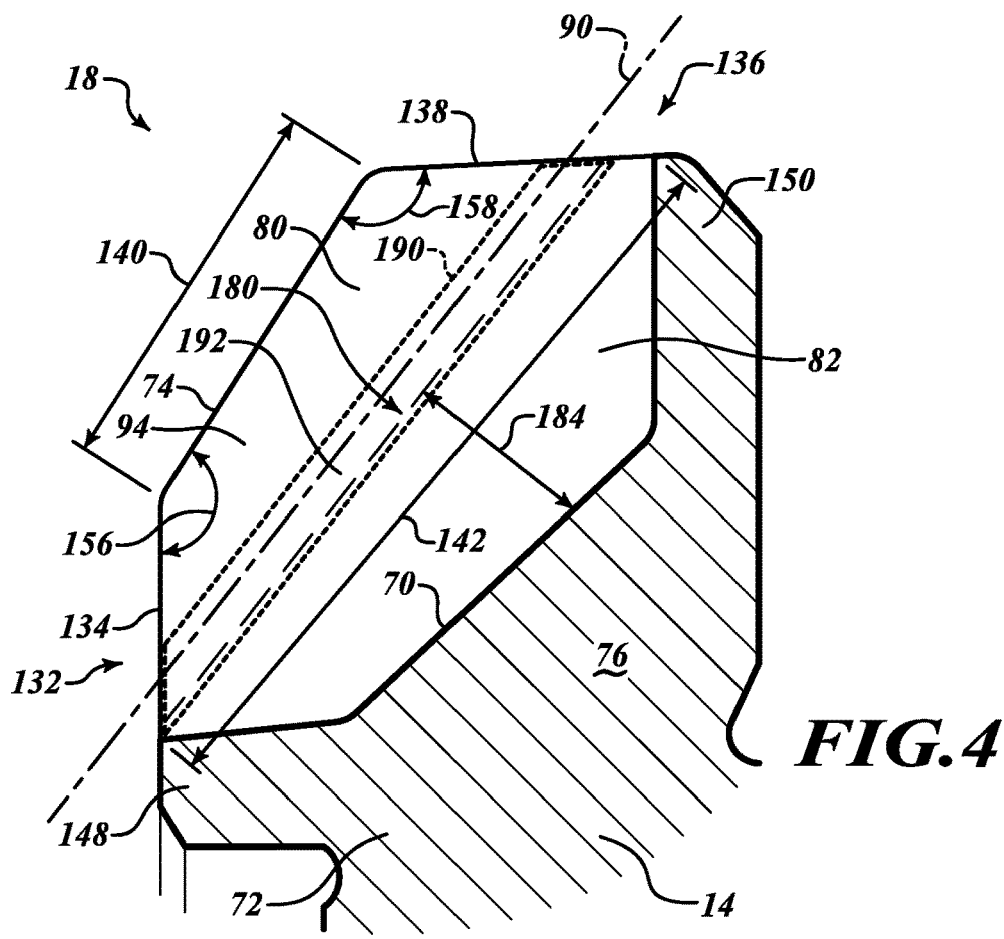
FIG. 4 is a diagram of a side of the side gear teeth of FIG. 2 having the involute section along a pitch line within the controlled relative radius of curvature section in accordance with the present teachings.
Figure 10:
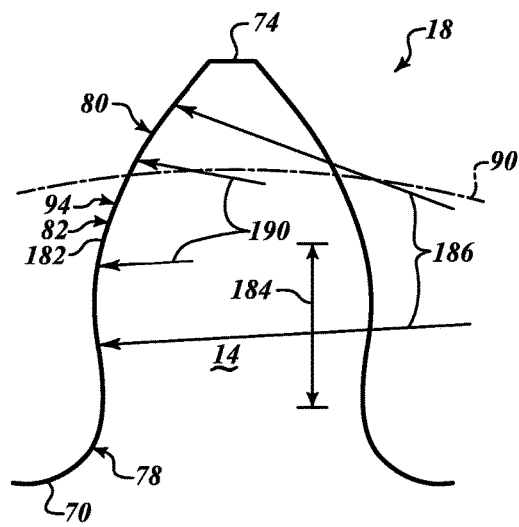

FIG. 10 a diagram of a cross-sectional shape of the curvature of the side gear tooth of FIG. 4.

Figure 11:
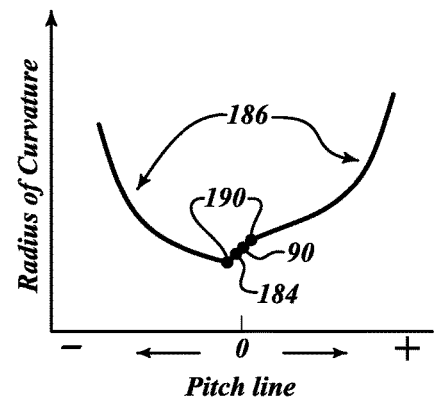

FIG. 11 is a diagram of the values of radius of curvature that correspond to the locations on the shape of the curvature on the side gear tooth illustrated in FIG. 10.

Figure 2:
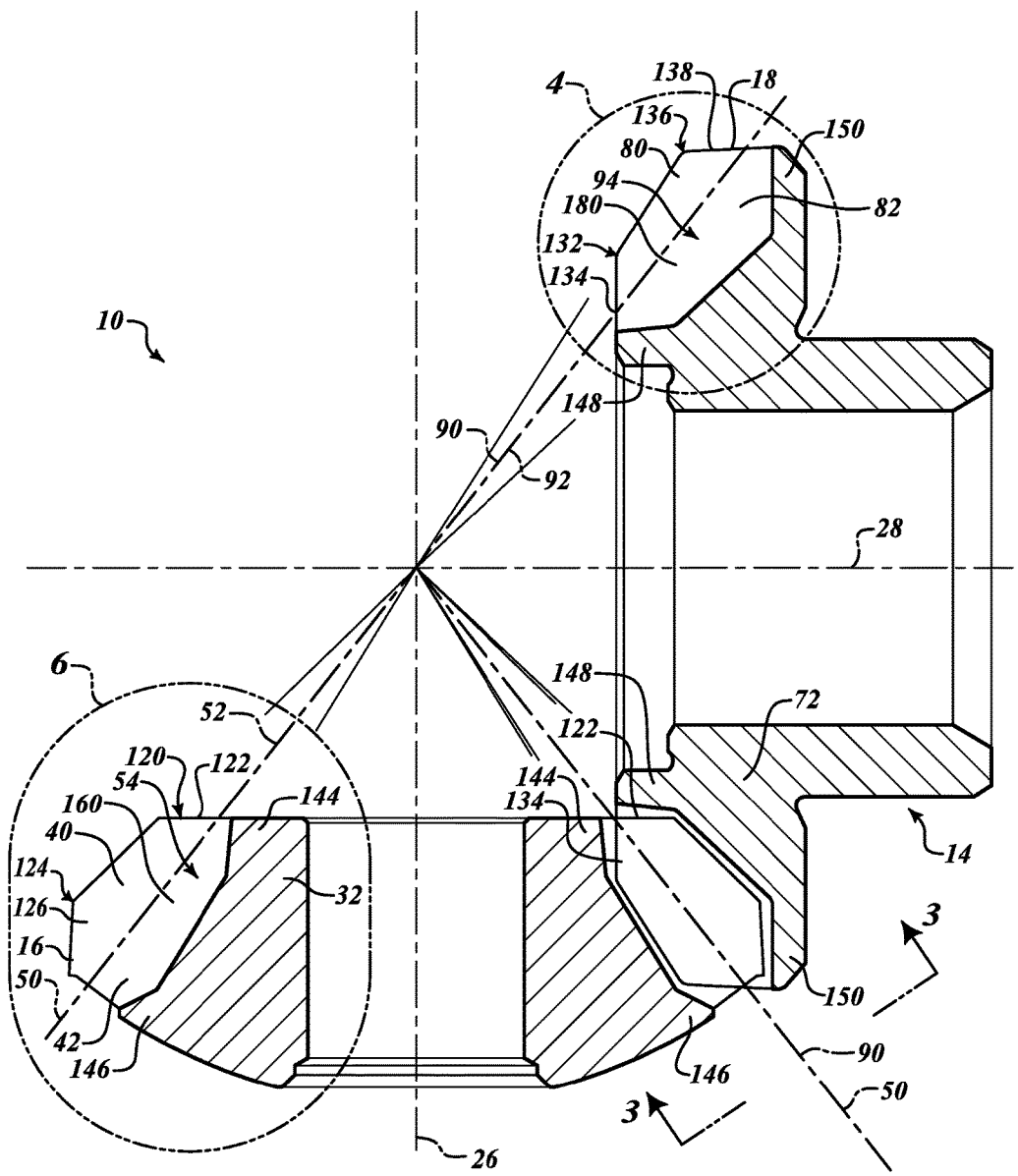
FIG. 2 is a diagram of the mating bevel gears having contact surfaces with an involute section within a controlled relative radius of curvature section in accordance with the present teachings.
Figure 12:
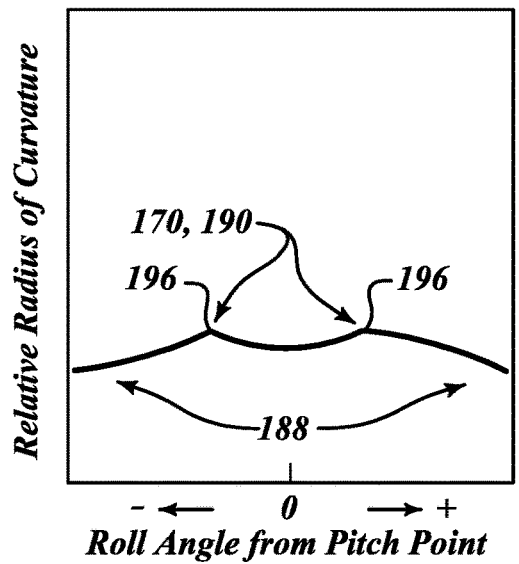

FIG. 12 is a diagram of a sum of the values of radius of curvature in the controlled relative radius of curvature section and in the involute section of the mating bevel gears in FIG. 2.

Figure 13:
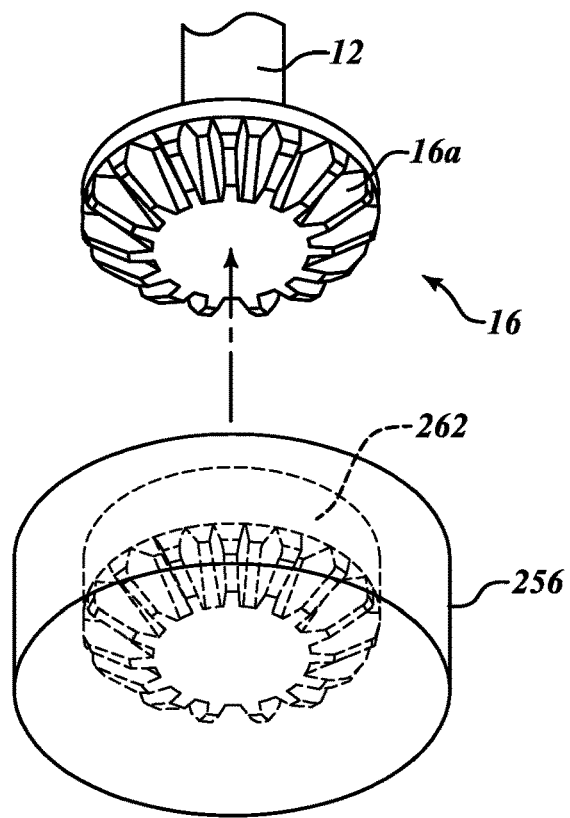

FIG. 13 is a diagram of a pinion gear formed with a forging die in accordance with the present teachings.

Figure 14:
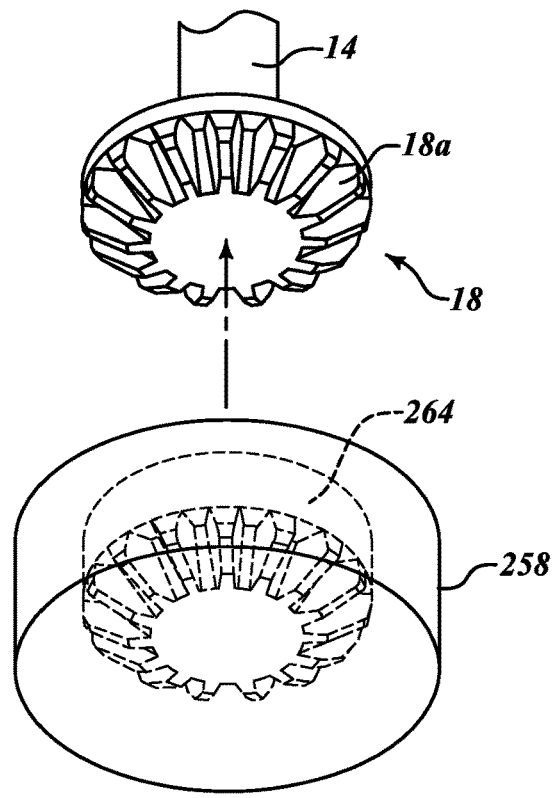

FIG. 14 is a diagram of a side gear formed with a forging die in accordance with the present teachings.

Figure 15:
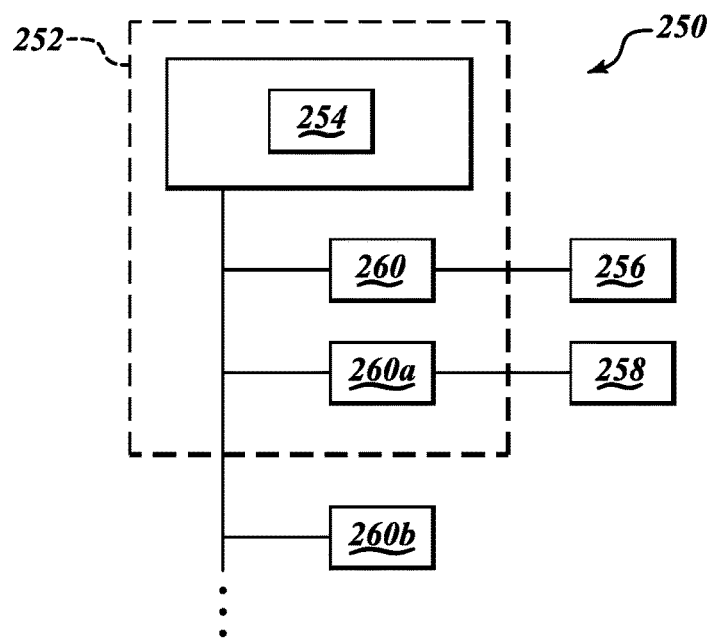

FIG. 15 is a diagram of a cutting system that provides a cutting program to fabricate the forging dies in accordance with the present teachings.

Figure 16:
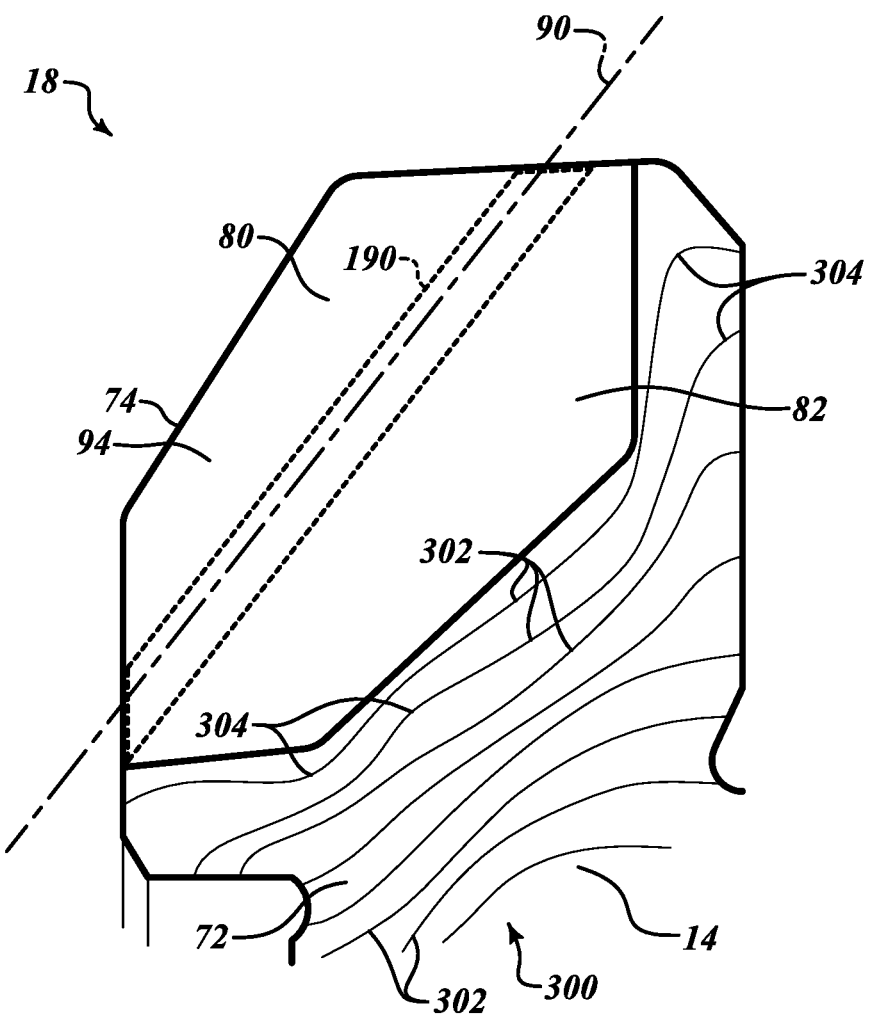

FIG. 16 is a diagram of a cross-sectional view through a top land of the side gear teeth of FIG. 4 having a grain structure that results from the forging process in accordance with the present teachings.

Figure 17:
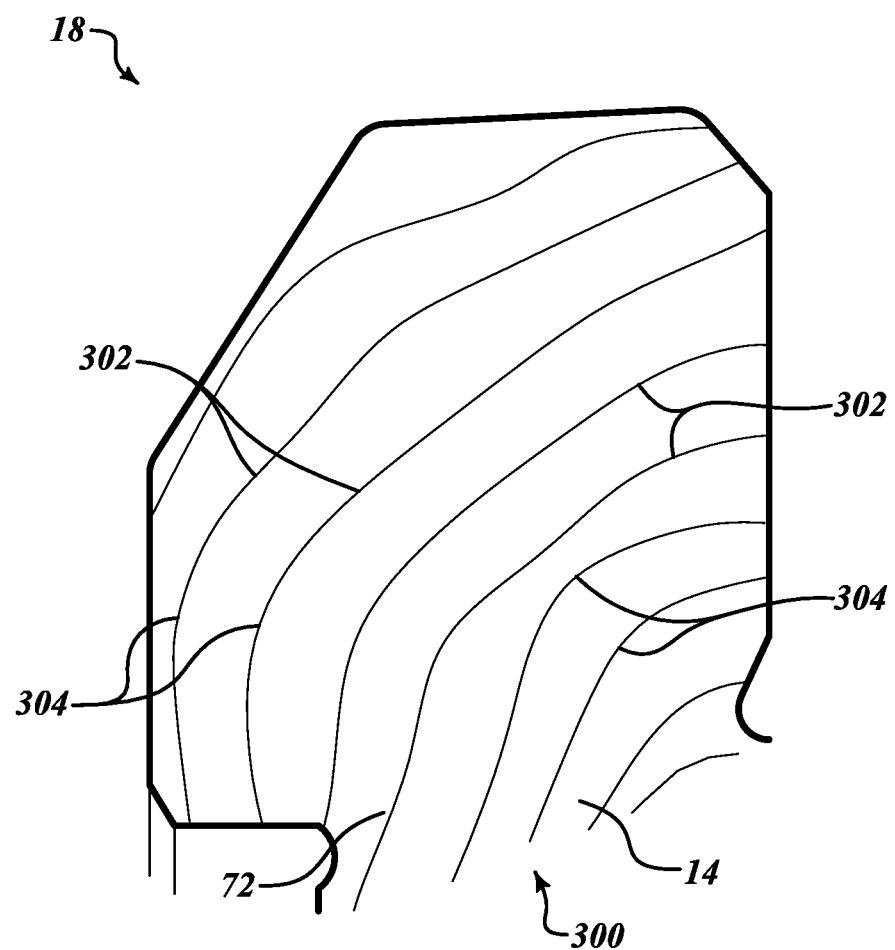

FIG. 17 is a diagram of a cross-sectional view similar to FIG. 16 and is through a bottom land of the side gear of FIG. 4 in accordance with the present teachings.

Figure 6:
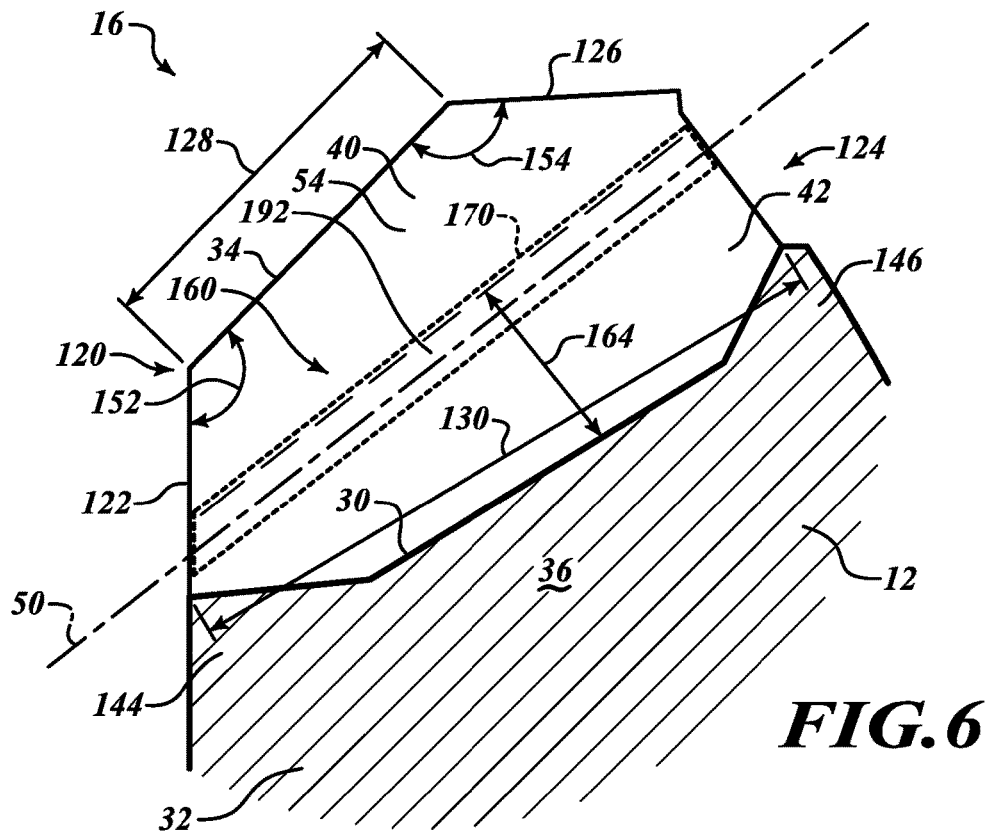
FIG. 6 is a diagram of a side of the pinion gear teeth having the involute section along a pitch line within the controlled relative radius of curvature section in accordance with the present teachings.
Figure 18:
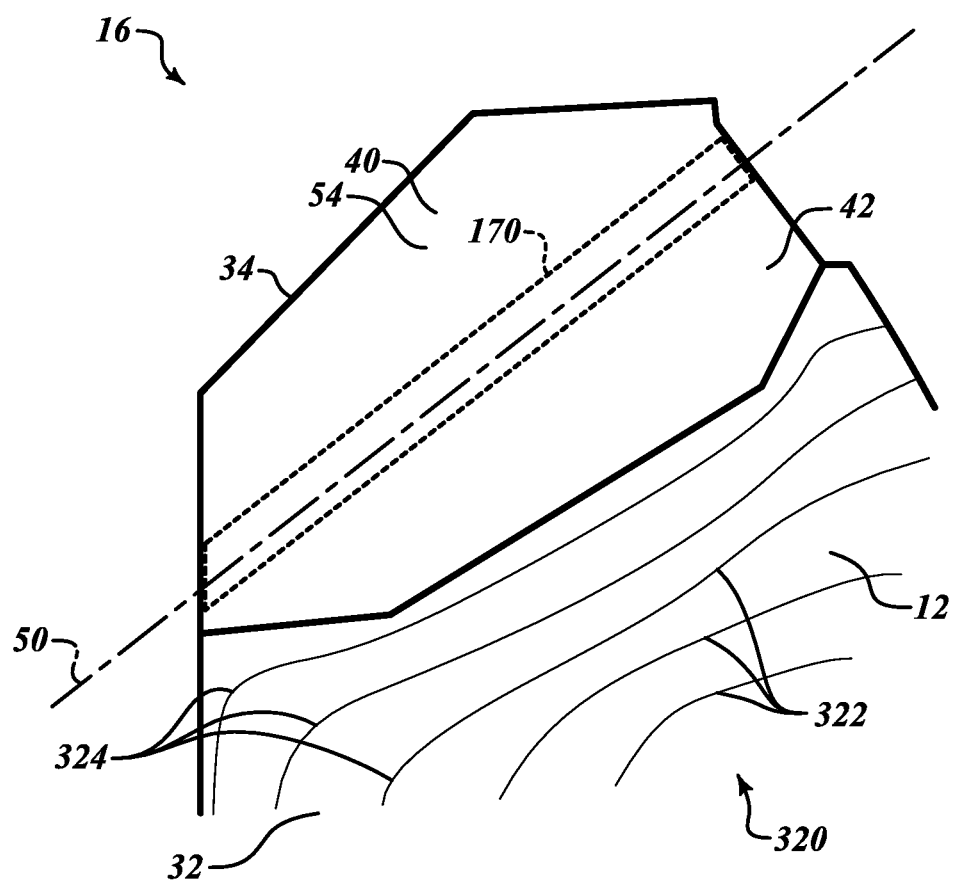

FIG. 18 is a diagram of a cross-sectional view through a top land of the pinion gear teeth of FIG. 6 having a grain structure that results from the forging process in accordance with the present teachings.

Figure 19:
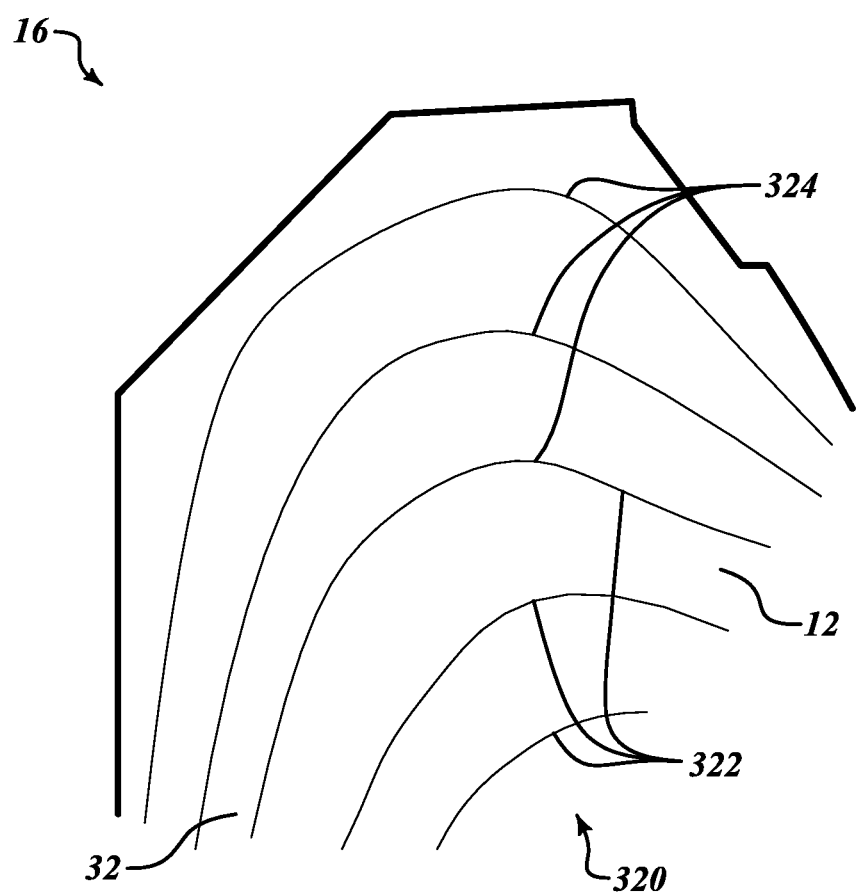

FIG. 19 is a diagram of a cross-sectional view similar to FIG. 18 and is through a bottom land of the pinion gear teeth of FIG. 6 in accordance with the present teachings.

Figure 20:
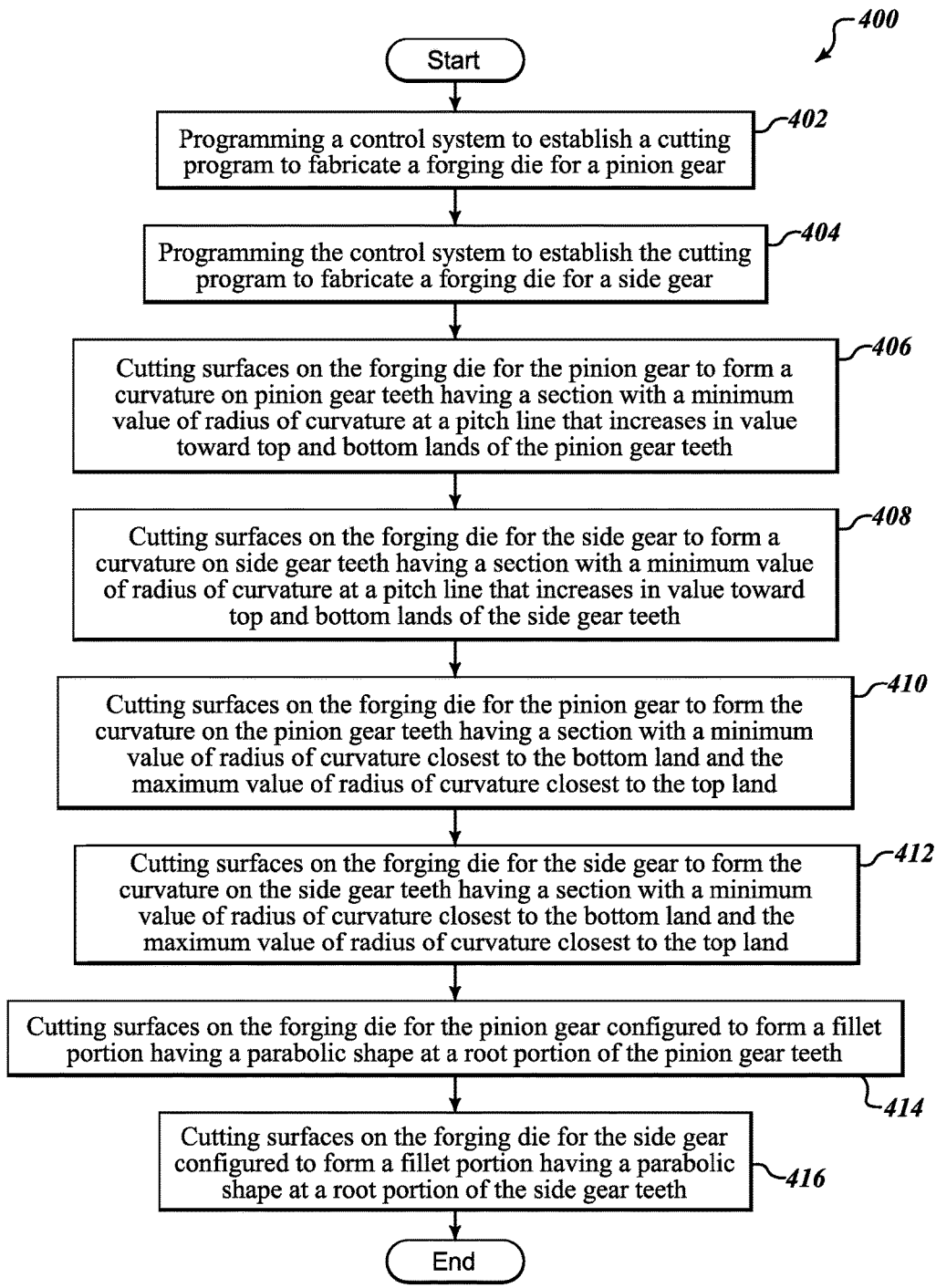

FIG. 20 is a diagram of a method of preparing forging dies with a cutting program to produce mating bevel gears with the controlled relative radius of curvature section and the involute section in accordance with the present teachings.

Figure 21:
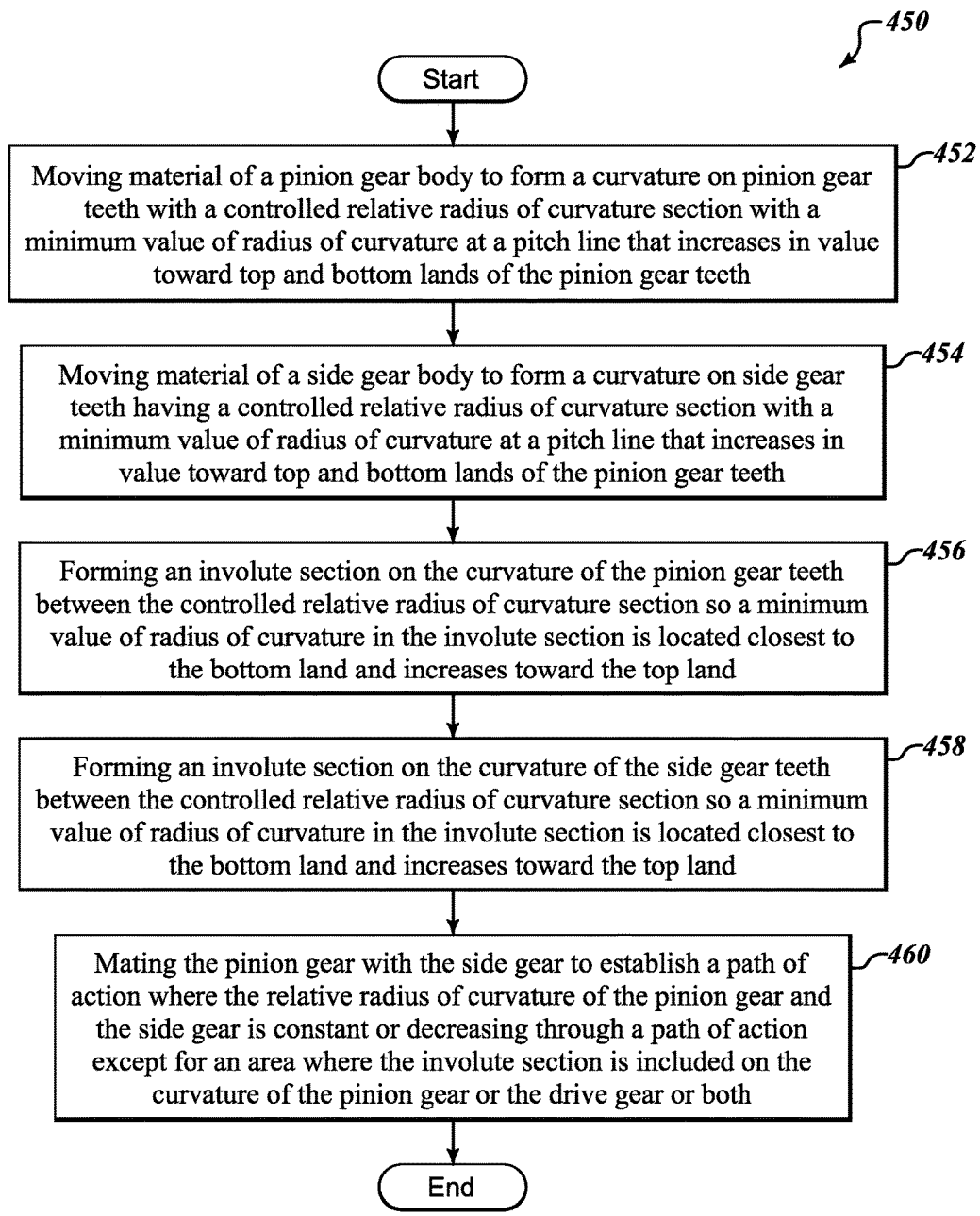

FIG. 21 is a diagram of a method of forging the mating bevel gears with the controlled relative radius of curvature section and the involute section in accordance with the present teachings.

Corresponding reference numerals indicate corresponding parts throughout the several views of the drawings.

DETAILED DESCRIPTION

Example aspects of the present teachings will now be described more fully with reference to the accompanying drawings.

Figure 1:
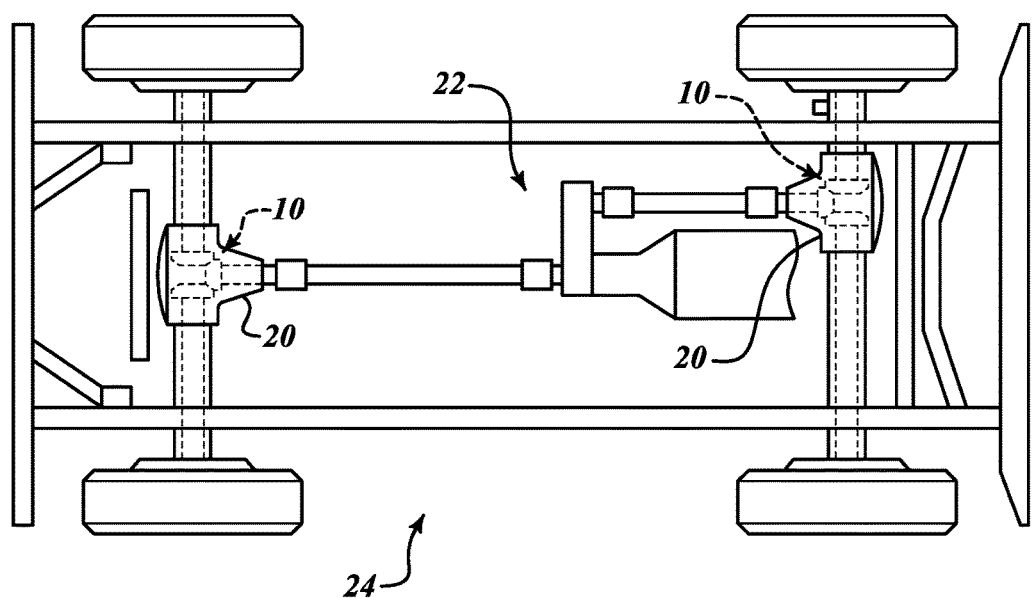
FIG. 1 is a diagram of an exemplary motor vehicle with a drivetrain having multiple differential assemblies including mating bevel gears in accordance with the present teachings.
Figure 3:
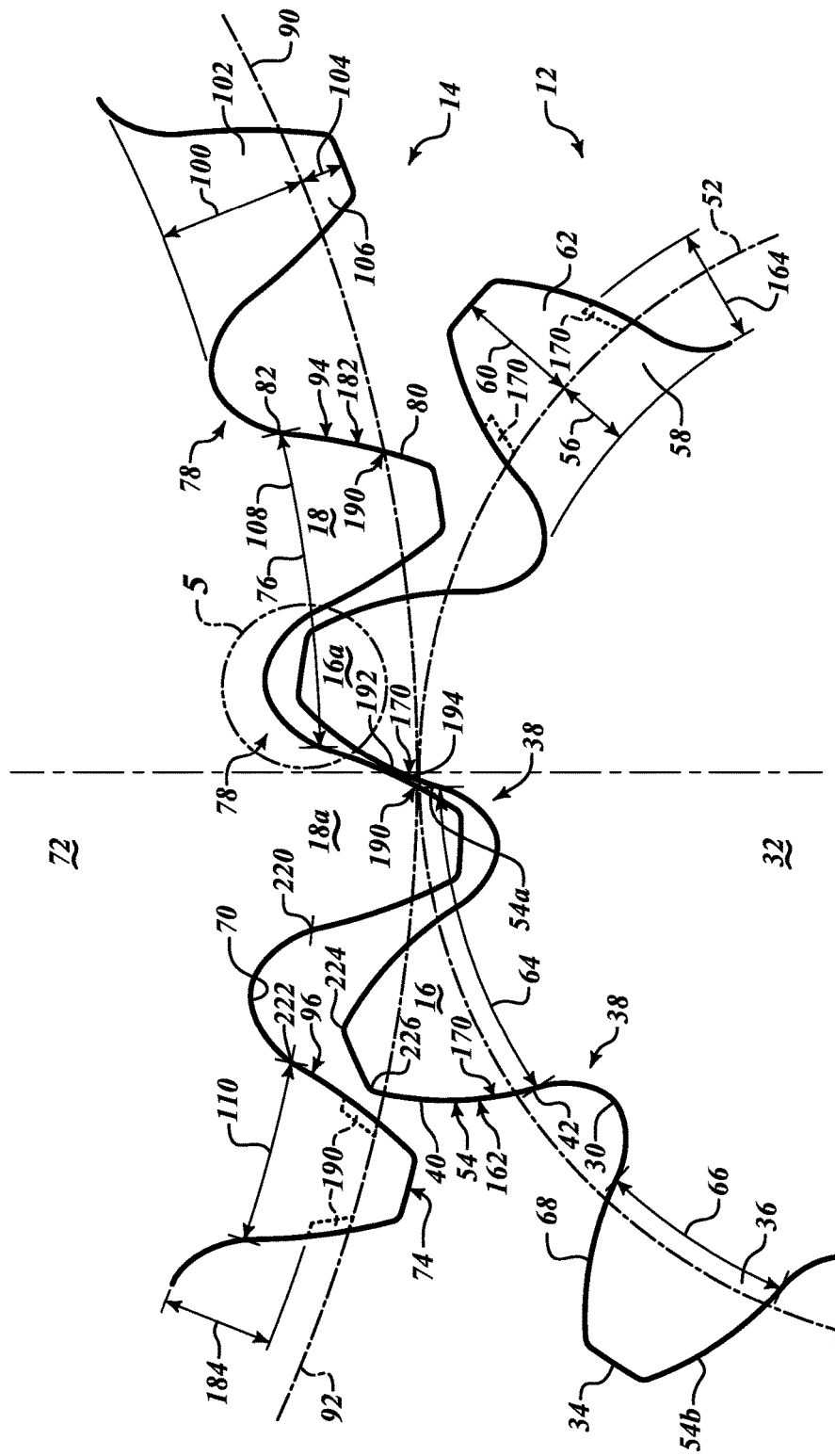
FIG. 3 is a diagram of mating gear teeth on the bevel gears of FIG. 2 in accordance with the present teachings.

The many aspects of the present teachings relate to gear tooth profiles that can be implemented on the gear teeth of mating bevel gears 10. With reference to FIGS. 1, 2, and 3, the mating bevel gears 10 can at least include a pinion gear 12 and a side gear 14. The pinion gear 12 has pinion gear teeth 16 and the side gear 14 has side gear teeth 18. The mating bevel gears 10 can be employed for example in one or more differential assemblies 20 that can be used in the drivetrain 22 of a motor vehicle 24, as shown in FIG. 1. The mating bevel gears 10 can also be employed for example in one or more transfer cases that can be used in the drivetrain 22 as applicable. It will be appreciated in light of the disclosure that the mating bevel gears 10 can be employed in many applications where the rotational forces are transmitted through intersecting axes.

The pinion gear teeth 16 and the side gear teeth 18 can be straight bevel gears. In other examples, the pinion gear teeth 16 and side gear teeth 18 can employ various intersecting-axis gear-types such as spiral bevel gears or Zerol® bevel gears depending on their application. The pinion and the side gear teeth 16, 18 can also employ crossed-axes-type gears such as hypoid bevel gears. In the various applications, the pinion gear 12 can rotate on an axis 26 that intersects with an axis 28, on which the side gear 14 rotates. In other examples, multiple pinion gears or multiple side gears or both can be employed. The description of the mating tooth profiles and relative shapes and curvatures herein of the pinion gear teeth 16 or the side gear teeth 18 or both can be applicable to all of the gear teeth 16, 18 on the pinion gear 12 and the side gear 14, respectively, unless noted otherwise.

With reference to FIGS. 2, 3, 6, and 7, the pinion gear teeth 16 on the pinion gear 12 can each extend from a bottom land 30 of a pinion gear body 32 and terminate at a top land 34. With regard to one pinion gear tooth 16 as an example of them all, a root portion 36 of the pinion gear tooth 16 can include a fillet portion 38 and a parabolic shape that extends from the fillet portion 38 to the next consecutive pinion gear tooth 16*a*. A face portion 40 and a flank portion 42 can be divided by a pitch line 50 of a pitch cone 52, as it can be defined by the pinion gear 12 and how it mates with the side gear 14.

With reference to FIG. 3, a distance 56 between the pitch line 50 and the bottom land 30 can define a dedendum portion 58 of the pinion gear tooth 16. A distance 60 from the pitch line 50 to the top land 34 can define an addendum portion 62 of the pinion gear tooth 16. A distance 64 can define a circular pitch between where the pitch line 50 intersects on the side 54 of the pinion gear tooth 16 and where the pitch line 50 intersects on the same side 54*a* of the next consecutive pinion gear tooth 16*a*. A distance 66 can define a circular thickness between where the pitch line 50 intersects one of the sides 54*b* of the pinion gear teeth 16 and its opposite side 68.

With reference to FIGS. 2-5, the side gear teeth 18 on the side gear 14 can each extend from a bottom land 70 of a side gear body 72 and terminate at a top land 74. With regard to one side gear tooth 18 as an example of them all, a root portion 76 of the side gear tooth 18 can include a fillet portion 78 and a parabolic shape that extends from the fillet portion 78 to the next consecutive pinion gear tooth 18*a*. A face portion 80 and a flank portion 82 can be divided by a pitch line 90 of a pitch cone 92, as it can be defined by the side gear 14 and how it mates with the pinion gear 12.

With reference to FIG. 3, a distance 100 between the pitch line 90 and the bottom land 70 can define a dedendum portion 102 and a distance 104 from the pitch line 90 to the top land 74 can define an addendum portion 106 of the side gear tooth 18. A distance 108 can similarly define a circular pitch of the side gear 14 between where the pitch line 90 intersects on the side 94 of the side gear teeth 18 and where it intersects on the same side 94*a* on the next consecutive side gear tooth 18*a*. A distance 110 can define a circular thickness between where the pitch line 90 of the pitch cone 92 intersects the side 94 of the side gear tooth 18 and its opposite side 96. It will be appreciated in light of the disclosure that the mating bevel gears 10 can be employed with a relatively short addendum portion 106 on the side gear 14 and a relatively long addendum portion 62 on the pinion gear 12, which can be shown to be beneficial in automotive applications to improve for example durability of the drivetrain components. The mating bevel gears 10 can also be employed with equal sized addendum portions 62, 106 or other specific combinations of addendum and dedendum portion dimensions.

With reference to FIG. 6, a toe portion 120 on the pinion gear tooth 16 can have a contoured edge 122. A heel portion 124 on the pinion gear tooth 16 can also have a contoured edge 126. In this example, the contoured edge 126 can include two non-parallel surfaces between the top land 34 and the bottom land 30. In this arrangement, a distance 128 between the toe portion 120 and the heel portion 124 near the top land 34 can be shorter than a distance 130 near the bottom land 30. With reference to FIG. 4, a toe portion 132 on the side gear tooth 18 can have a contoured edge 134. A heel portion 136 on the side gear tooth 18 can also have a contoured edge 138 so that a distance 140 between the toe portion 132 and the heel portion 136 near the top land 74 can be shorter than a distance 142 near the bottom land 70. The pinion gear teeth 16 and the side gear teeth 18 can a trapezoidal shape.

With reference to FIGS. 3 and 6, the root portion 36 of the pinion gear tooth 16 can define a toe web portion 144. The contoured edge 122 can be disposed between the top land 34 and the toe web portion 144. At the heel portion 124, the root portion 36 of the pinion gear tooth 16 can define a heel web portion 146 that can be disposed between the top land 34 and the bottom land 30. The toe web portion 144 and the heel web portion 146 can each form a flat outer diameter surface on the body 32 of the pinion gear 12. At the toe portion 132, the root portion 36 of the side gear tooth 18 can define a toe web portion 148 between the top land 74 and the bottom land 70. At the heel portion 136, the root portion 36 can define a heel web portion disposed between the top land 74 and the bottom land 70. The toe web portion 148 and the heel web portion 150 can each form a flat outer diameter surface on the body 72 of the side gear 14. In some examples, the shape of the pinion gear teeth 16 and the side gear teeth 18 can be configured to fit into a housing of certain drivetrain components.

With reference to FIGS. 4 and 6, one or more of the contoured edges 122, 126, 134, 138 can form a generally planar surface that can be disposed transverse to the top land 34, 74. In other examples, one or more of the contoured edges 122, 126, 134, 138 can at least be configured with a circular or a conically shaped surface. Each of the contoured edges 122, 126, 134, 138 can also be configured to form an angle 152, 154, 156, 158, respectively, with the top lands 34, 74. One or more of the angles 152, 154, 156, 158 can have a value that is less than ninety degrees.

With reference to FIGS. 6-9, the side 54 of the pinion gear tooth 16 can define a contact surface 160 having a curvature 162. The contact surface 160 can extend along the pitch line 50 defined by the pinion gear 12 and into the face portion 40 and the flank portion 42. The side 54 of the pinion gear tooth 16 can also define a mid-height 164 (i.e., center height). In this example, the mid-height 164 can be above the pitch line 50 and therefore between the pitch line 50 and the top land 34.

The curvature 162 in the contact surface 160 can define a controlled relative radius of curvature section 166. Within the controlled relative radius of curvature section 166, the curvature 162 can define a minimum value of radius of curvature closest to the pitch line 50 but the radius of curvature can increase in value toward the top land 34 and through the mid-height 164 of the pinion gear tooth 16. The radius of curvature can also increase in value toward the bottom land 30. It will be appreciated in light of the disclosure that the contact surface 160 on the pinion gear tooth 16 can establish the controlled relative radius of curvature section 166 when mated with the side gear tooth 18 having a similar controlled relative radius of curvature section (i.e., a conjugate) described herein.

The contact surface 160 on the side 54 of the pinion gear teeth 16 can also include an involute section 170. Within a portion of the curvature 162 that defines the involute section 170, the curvature 162 can define a minimum value of radius of curvature closest to the bottom land 30. The value of radius of curvature can increase toward the top land 34 where the involute section 170 can end and the value of radius of curvature can be at its maximum. The pitch line 50 can extend through the involute section 170 on the contact surface 160.

In some of the examples, the involute section 170 can be configured to extend along the pitch line 50 and into the face portion 40 but can terminate before reaching the mid-height 164. The involute section 170 can also terminate beyond the mid-height 164 or the pitch line 50 or both. Moreover, the involute section 170 can terminate before the mid-height 164 or the pitch line 50 or both. It will be appreciated in light of the disclosure that the involute section 170 can also be configured to have a shape that varies along the curvature 162 in the direction between the bottom land 30 and the top land 34 or between the toe portion 120 and the heel portion 124 or both.

With reference to FIGS. 10 and 11, the side 94 of the side gear tooth 18 can define a contact surface 180 having a curvature 182. The contact surface 180 can extend along the pitch line 90 defined by the side gear 14 and into the face portion 80 and the flank portion 82. The side 94 of the side gear teeth 18 can also define a mid-height 184 (i.e., center height). In this example, the mid-height 164 can be below the pitch line 90 and therefore between the pitch line 90 and the bottom land 70.

The curvature 182 in the contact surface 180 can define a controlled relative radius of curvature section 186. Within the controlled relative radius of curvature section 186, the curvature 182 can define a minimum value of radius of curvature closest to the pitch line 90 but the value of the radius of curvature can increase toward the top land 74 of the side gear tooth 18. The curvature 182 can also define an increasing value of radius of curvature toward the bottom land 70 of the side gear tooth 18 through the mid-height 184. It will be appreciated in light of the disclosure that the contact surfaces 160, 180 can establish a relative radius of curvature section 188 composed of the relative radius of curvature sections 166, 186 when the pinion gear 12 mates with the side gear 14.

The contact surface 180 on the side 94 of the side gear teeth 18 can also include an involute section 190. In the involute section 190, the curvature 182 can define a minimum value of radius of curvature closest to the bottom land 70 that can increase toward a maximum value closest to the top land 74 of the side gear tooth 18. The pitch line 90 extends through the involute section 190 on the contact surface 180.

The involute section 190 can be configured to extend along the pitch line 90 and into the flank portion 82 but terminate before reaching the mid-height 184. The involute section 190 can also terminate beyond the mid-height 184 or the pitch line 90 or both. Moreover, the involute section 190 can also terminate before the mid-height 184 or the pitch line 90 or both. It will be appreciated in light of the disclosure that the involute section 190 can also be configured to have a shape that varies along the curvature 182 in the direction between the bottom land 70 and the top land 74 or between the toe portion 132 and the heel portion 136 or both.

With references to FIGS. 2, 3, 4, 6, and 12, the contact surfaces 160, 180 can cooperate to establish a path of action 192 when the pinion gear 12 mates with the side gear 14. At a pitch point 194 where the gears 12, 14 can mesh, the involute section 170 on the pitch line 50 can mate with the involute section 190 on the pitch line 90. As the gears 12, 14 continue to rotate, the controlled relative radius of curvature section 166 on the pinion gear 12 can encounter the controlled relative radius of curvature section 186 on the side gear 14 to mesh and provide the controlled relative radius of curvature section 188 on the mating bevel gears 10.

With the above in mind, FIG. 12 illustrates the relative radius of curvature (i.e., the sum of each curvature 162, 182) as the gear teeth 16, 18 roll through mesh. Because it can be shown that the relative radius of curvature is proportional to contact stress experienced by the gear teeth 16, 18, the contact stress does not increase (i.e., remains constant or decreases) as the contact between the gear teeth 16, 18 moves away from the pitch line 50, 90. In contrast, gear teeth both having an involute profile will experience increasing contact stress as the contact between the gear teeth moves away from their respective pitch lines.

As the gears 12, 14 rotate away from the pitch point 194 at the pitch lines 50, 90, a value of the relative radius of curvature at a point of contact (i.e., where the curvatures 162, 182 touch) can increase until a transition 196 out of the involute sections 170, 190 and into the controlled relative radius of curvature section 188, as illustrated in FIG. 12. From the transition 196, the value of the relative radius of curvature can decrease.

In other examples, the value of the relative radius of curvature can remain nearly constant or decrease after the transition 196. It will be appreciated in light of the disclosure that the value of the controlled relative radius of curvature (i.e., CRRC) is equal to the sum of the value of the radius of curvature of the pinion gear teeth (i.e., $1/R_P$) and the value of the radius of curvature of the side gear teeth (i.e., $1/R_S$) at a point of contact. In this regard, radius of curvature can be defined as the reciprocal of the curvature of the gear. As shown in the equation below, the controlled relative radius of curvature (i.e., CRRC) of the mating bevel gears 10, can therefore be decreasing in value when the point of contact is moving through the controlled relative radius of curvature sections 166, 186 and can be increasing in value when the point of contact is moving through the involute sections 170, 190, as shown in FIG. 12.

$$CRRC = \frac{1}{R_P} + \frac{1}{R_S}$$

It will be appreciated in light of the disclosure that by employing computer controlled cutting of the forging dies to produce the pinion gear 12 and the side gear 14, the curvatures 162, 182 can be controlled to produce the constant or decreasing value of the relative radius of curvature in relative radius of curvature sections 166, 186 of the mating bevel gears 10 outside of the involute sections 170, 190. In this regard, the path of action 192 of the mating bevel gears 10 can be variable, in contrast to a fixed path of action that can be defined by mating gears both with an involute profile.

It will be appreciated in light of the disclosure that the controlled relative radius of curvature section 166, 186 can vary slightly based on tolerances in the construction of the mating bevel gears 10. In this regard, the controlled relative radius of curvature section 188 (i.e., the mating combination of the relative radius of curvature sections 166, 186) can be defined to include changes in the differences in value of the two radius of curvatures due to the acceptable range of manufacturing tolerances for the application. The value of the relative radius of curvature notwithstanding can decrease across the contact surfaces 160, 180 toward the top lands 34, 74 and the bottom lands 30, 70 except for the involute sections 170, 190.

It will be appreciated in light of the disclosure that the pinion and the side gear teeth 16, 18 can be configured with one or more profile modifications to accommodate distortions of the gear teeth 16, 18 when under load. For example, the curvature 162, 182 can be configured to be formed on the side 54, 94 of the pinion and the side gear teeth 16, 18 in an intermediate form. When the gear teeth 16, 18 are deformed under load, the curvatures 162, 182 can be distorted into a desired, predetermined configuration (i.e., a final form) from the intermediate form. In addition, leading edges (e.g.: the side 54, 94) of the pinion and the side gear teeth 16, 18 can be specifically reduced in size to accommodate the encroachment of the immediately preceding gear tooth as the gear teeth 16, 18 bend under load. In this regard, the circular thickness (e.g., the distance 66, 110) is reduced but only from the leading edge side 54, 94 and, therefore, an asymmetry can be purposefully introduced into the gear teeth 16, 18.

Figure 5:
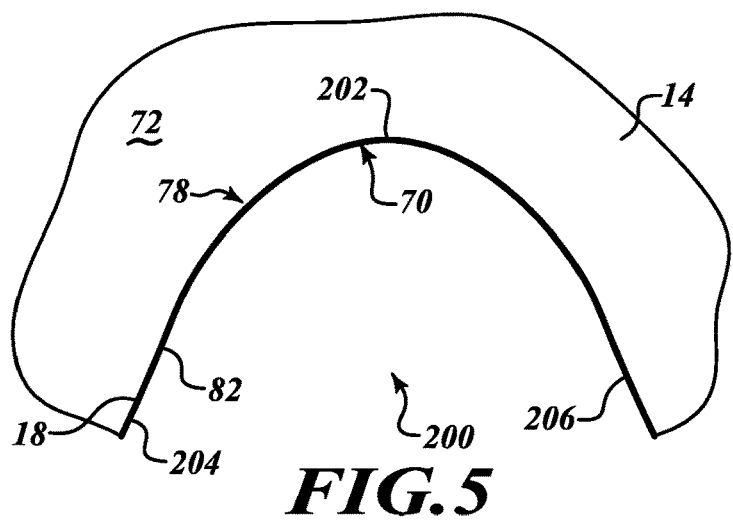
FIG. 5 is a diagram of a parabolic shape formed between the side gear teeth of FIG. 2 in accordance with the present teachings.
Figure 7:
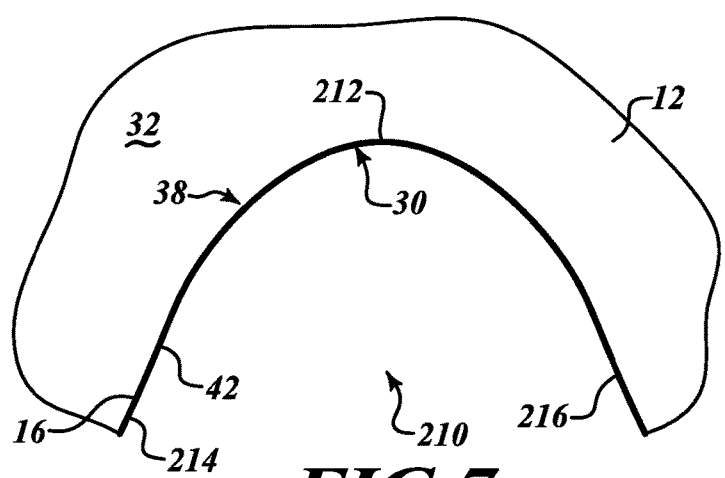
FIG. 7 is similar to FIG. 5 and shows a parabolic shape between the pinion gear teeth in accordance with the present teachings.
Figure 8:
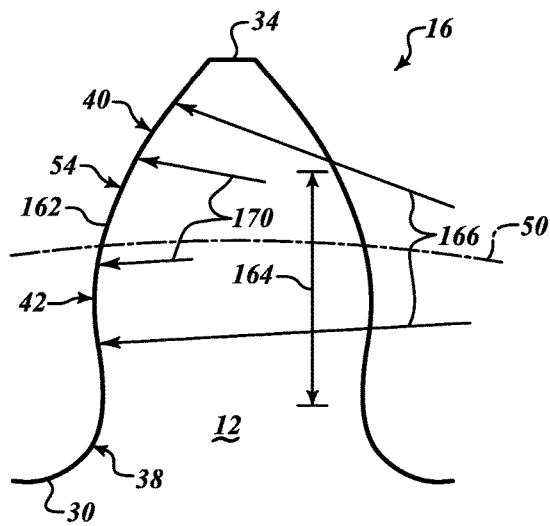
FIG. 8 is a diagram of a cross-sectional shape of the curvature of the pinion gear tooth of FIG. 6.
Figure 9:
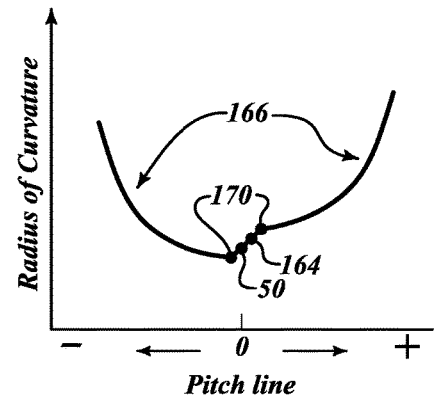
FIG. 9 is a diagram of the values of radius of curvature that correspond to the locations on the shape of the curvature on the pinion gear tooth illustrated in FIG. 8.

With reference to FIGS. 3, 5, and 7, a parabolic shape 200 can extend from the fillet portion 78 on the side gear tooth 18. The parabolic shape 200 can have a bottom 202 and ends 204, 206 that are contoured into the fillet portion 78. The distances from the bottom 202 to the ends 204, 206 can be based on the contact surface 160 and a distance between the top land 34 and a beginning of the contact surface 160 on the pinion gear teeth 16. A parabolic shape 210 can extend from the fillet portion 38 on the pinion gear tooth 16. The parabolic shape 210 can have a bottom 212 and ends 214, 216 that are contoured into the fillet portion 38. The distances from the bottom 212 to the ends 214, 216 can be based on the contact surface 160 and a distance between the top land 74 and a beginning of the contact surface 180 on the side gear teeth 18. The bottoms 202, 212 of the parabolic shapes 200, 210 can be centered between the ends 204, 206, 214, 216 or skewed toward an applicable gear tooth. The parabolic shape 200, 210 can be shown to maximize the radius of curvature near the root portion 36, 76 of the gear teeth 16, 18, respectively, at a location of relatively high bending stress. By doing so, this can be shown to relatively reduce local bending stress. When the gear teeth 16, 18 employ the controlled relative radius of curvature sections 166, 186 along with the involute sections 170, 190, respectively; the mating bevel gears 10 can be shown to have reduced sensitivity to the distance between the intersecting axes 26, 28 (FIG. 2).

Because the curvatures 162, 182 are implemented on the gear teeth 16, 18 with a forging process, it can be shown that undercutting of the gear teeth 16, 18 can be eliminated while still implementing the fillet portions 38, 78 with the parabolic shape 200, 210. By eliminating the undercutting, the gear teeth 16, 18 can be implemented with coarser and taller gear teeth 16, 18, which can provide a relatively larger circular thickness and relatively higher contact ratios. The controlled relative radius of curvature sections 166, 186 can be shown to provide near constant contact stress through the path of action 192 on the gear teeth 16, 18. Because of the elimination of undercutting, the implementation of taller and coarser gear teeth, or the relative reduction of bending stresses or both; the mating bevel gears 10 can be shown to have a relatively increased power density so that more torque can be transmitted with less gear teeth.

With reference to FIGS. 13, 14, and 15, the pinion gear 12 and the side gear 14 can be fabricated using a forging process 250. The forging process 250 can include a control system 252 that can be programmed to produce a cutting program 254. The cutting program 254 can be configured to fabricate one or more forging dies 256 to form the pinion gear 12 and one or more forging dies 258 to form the side gear 14.

The forging dies 256, 258 can be fabricated with one or more cutting systems 260. In one example, the cutting systems 260 can include one or more numerically controlled mills (e.g., 260a, 260b) or other suitable computer controlled cutting systems 260. The cutting systems 260 can employ a computer-guided ball-mill cutter that can cut the forging dies 256, 258. It will be appreciated in light of the disclosure that the sides 54, 94 of the gear teeth 16, 18 could be formed point-to-point by hand but cannot be formed by any automated continuous cutting operation, such as hobbing.

The cutting systems 260 can cut (i.e., remove material from) multiple surfaces 262 on the one or more forging dies 256 that can be used to form the pinion gear tooth 16. The cutting system 260 can also form multiple surfaces 264 on the one or more forging dies 258 that can be used to produce the side gear 14. The forging dies 256, 258 can be configured to produce the controlled relative radius of curvature sections 166, 186 and the involute sections 170, 190 in the curvatures 162, 182 on the gear teeth 16, 18, respectively, as shown in FIGS. 8-11. It will be appreciated in light of the disclosure that the curvatures 162, 182 could be implemented on the gear teeth 16, 18 using manual point-to-point cutting operations, but doing so can be shown to require continual relocation of the cutting head and the introduction of undercutting. With that said, it will also be appreciated in light of the disclosure that the forging process 250 can be shown to provide one or more relatively efficient production processes that can be used to forge the gears 12, 14 on a mass production scale.

With reference to FIGS. 16 and 17, a grain structure 300 is shown in a cross-sectional view of the side gear teeth 18 that is sectioned along the axis 28 (FIG. 2) of the side gear 14. Lines 302 of the grain structure 300 can radiate in a relatively concentric formation about the axis 28. The lines 302 can follow the changing shape of the side gear teeth 18 as they are formed during the forging process. In contrast to a cut gear where the grain structure is interrupted by the cutting process (i.e., the grain is cut) and leaves imperfections on the face of the gears, the forging process causes the contours 304 of the lines 302 of the grain structure 300 to follow the shape of the forged material.

During the forging process, the material can flow along the lines 302 of the grain structure 300, as the grain structure 300 is compressed during the forging process. In FIG. 17 where the cross-sectional view is taken at the bottom land 70 of the side gear teeth 18, the grain structure 300 is more compressed relative to the cross-sectional view taken at the top land 74 of the side gear teeth 18 in FIG. 16 where the grain structure 300 extends into the side gear tooth 18. The lines 302 of the grain structure 300 nevertheless can at least partially lie parallel to the surfaces of the tooth profile in the root portion 76 and along the top land 74.

With reference to FIGS. 17 and 18, a grain structure 320 is shown in a cross-sectional view of the pinion gear teeth 16 that is sectioned along the axis 26 (FIG. 2) of the pinion gear 12. Lines 322 of the grain structure 320 can radiate in a relatively concentric formation about the axis 26. The lines 322 can follow the changing shape of the pinion gear teeth 16 as they are formed during the forging process. To that end, the forging process causes the contours 324 of the lines 322 of the grain structure 320 to follow the shape of the forged material.

During the forging process, the material can flow along the lines 322 of the grain structure 320 as the grain structure 320 is compressed during the forging process. In FIG. 19 where the cross-sectional view is taken at the bottom land 30 of the pinion gear teeth 16, the grain structure 320 is more compressed relative to the cross-sectional view taken at the top land 34 of the pinion gear teeth 16 in FIG. 18 where the grain structure 320 extends into the pinion gear tooth 16. The lines 322 of the grain structure 320 nevertheless can at least partially lie parallel to the surfaces of the tooth profile in the root portion 36 and along the top land 34.

With reference to FIG. 20, the present teachings include an exemplary method 400 for the fabrication of the one or more forging dies 256, 258 to create the mating bevel gears 10 in accordance with the present teachings. In box 402, the method 400 can include programming the control system 252 that can be used to establish the cutting program 254. The cutting program 254 can, for example, run one or more computer controlled cutting machines to fabricate the forging die 256 that can be for the pinion gear 12. In one example, the ball-mill cutter can be used to cut the forging die 256 based on the cutting program 254. In box 404, the method 400 can include programming the control system 252 to establish the cutting program 254 for the forging die 258 that is configured to form the side gear 14. The cutting system 260 can use the cutting program 254 to employ computer controlled cutters, such as the ball-mill cutter, that can be used to cut the multiple surfaces 262 on the forging die 258.

In box 406, the method 400 can include cutting the multiple surfaces 262 on the forging die 256 for the pinion gear 12 with the cutting system 260. The surfaces 262 on the forging die 256 for the pinion gear 12 can be configured to form the curvature 162 on the side 54 of the pinion gear teeth 16. The curvature 162 can be formed with the forging process 250 to include the minimum value of radius of curvature closest to the pitch line 50 of the pinion gear tooth 16 and an increasing value of radius of curvature toward the top land 34 and toward the bottom land 30 of the pinion gear tooth 16.

In box 408, the method 400 can include cutting the multiple surfaces 264 on the forging die 258 for the side gear 14 with the cutting program 254. The multiple surfaces 264 on the forging die 258 for the side gear 14 can be configured to form the curvature 182 on the side 94 of the side gear teeth 18. The forging die 258 can form the controlled relative radius of curvature section 166. The curvature 182 on the side 94 of the side gear tooth 18 can therefore include the minimum value of radius of curvature closest to the pitch line 90 of the side gear tooth 18 and an increasing value of radius of curvature toward the top land 74 and toward the bottom land 70 of the side gear tooth 18.

In box 410, the method 400 can include cutting the multiple surfaces 262 on the forging die 256 for the pinion gear 12 so the forging die 256 can be configured to provide the involute section 170 on the curvature 162 of the pinion gear tooth 16. The involute section 170 can be disposed within (i.e., interrupt) the controlled relative radius of curvature section 166. Within the involute section 170, the minimum value of radius of curvature can be closest to the bottom land 30 and the value of radius of curvature can increase toward the top land 34.

In box 412, the method 400 can include cutting the multiple surfaces 264 on the forging die 258 for the side gear 14. The surfaces 264 can be configured to provide the involute section 190 on the curvature 182 of the side gear tooth 18. The involute section 190 can be disposed within (i.e., interrupt) the controlled relative radius of curvature section 186. Within the involute section 190, the minimum value of radius of curvature can be closest to the bottom land 70 and the value of radius of curvature can increase toward the top land 74. In box 414, the method 400 can include cutting the multiple surfaces 262 to include the fillet portion 38 and the parabolic shape between the pinion gear teeth 16. In box 416, the method 400 can include cutting the multiple surfaces 264 to include the fillet portion 78 and the parabolic shape between the side gear teeth. From box 416, the method 400 ends.

With reference to FIG. 19, the present teachings generally include a method 450 of forging the mating bevel gears 10. In box 452, the method 450 includes forming the pinion gear 12 with the pinion gear teeth 16 using the forging die 256 to move material of the pinion gear body 32 and establish the curvature 162 on the side 54 of the pinion gear tooth 16. The curvature 162 can include a minimum value of radius of curvature near the pitch line 50 of the pinion gear tooth 16 and an increasing value of radius of curvature toward the top land 34 and the bottom land 30 of the pinion gear tooth 16.

In box 454, the method 450 also includes forming the side gear 14 with the side gear teeth 18 using the forging die 258 to move material of the side gear body 72 and establish the curvature 182 on the side 94 of the side gear tooth 18. The curvature 182 can include the minimum value of radius of curvature near the pitch line 50 of the pinion gear tooth 16 and an increasing value of radius of curvature toward the top land 74 and the bottom land 70 of the side gear tooth 18.

In box 456, the method includes forming an involute section 170 on the curvature 162 of the pinion gear teeth 16. The involute section 170 is formed with the forging die 256 to have a minimum value of radius of curvature in the involute section 170 closest to the bottom land 30. The value of the radius of curvature in the involute section 170 increases toward the top land 34. In box 458, the method includes forming the involute section 190 on the curvature 182 with the forging die 258 on the side gear teeth 18. The involute section 190 is formed within (i.e., interrupts) the controlled relative radius of curvature section 186. Within the involute section 190, the minimum value of radius of curvature is closest to the bottom land 70 and the value of radius of curvature increases towards the top land 74.

In box 460, the method includes mating the pinion gear 12 with the side gear 14 to establish a path of action 192. Along the path of action 192 where the mating bevel gears 10 mesh, the relative radius of curvatures at a point of contact can be shown to be constant or decreasing in value for the pinion gear 12 and the side gear 14 except for the location where the involute section 170, 190 is included on the curvature 162, 182 of the pinion gear 12 or the side gear 14 or both. From box 460, the method 450 ends.

| REF. NO. | ELEMENT |
| --- | --- |
| 10 | mating bevel gears |
| 12 | pinion gear |
| 14 | side gear |
| 16 | pinion gear teeth |
| 18 | side gear teeth |
| 20 | differential assemblies |
| 22 | drivetrain |
| 24 | motor vehicle |
| 26 | axis |
| 28 | axis |
| 30 | bottom land |
| 32 | pinion gear body |
| 34 | top land |
| 36 | root portion |
| 38 | fillet portion |
| 40 | face portion |
| 42 | flank portion |
| 50 | pitch line |
| 52 | pitch cone |
| 54 | side |
| 56 | distance |
| 58 | dedendum portion |
| 60 | distance |
| 62 | addendum portion |
| 64 | distance |
| 66 | distance |
| 68 | opposite side |
| 70 | bottom land |
| 72 | side gear body |
| 74 | top land |
| 76 | root portion |
| 78 | fillet portion |
| 80 | face portion |
| 82 | flank portion |
| 90 | pitch line |
| 92 | pitch cone |
| 94 | side |
| 96 | opposite side |
| 100 | distance |
| 102 | dedendum portion |
| 104 | distance |
| 106 | addendum portion |
| 108 | distance |
| 110 | distance |
| 120 | toe portion |
| 122 | contoured edge |
| 124 | heel portion |
| 126 | contoured edge |
| 128 | distance |
| 130 | distance |
| 132 | toe portion |
| 134 | contoured edge |
| 136 | heel portion |
| 138 | contoured edge |
| 140 | distance |
| 142 | distance |
| 144 | toe web portion |
| 146 | heel web portion |

-continued

| REF. NO. | ELEMENT |
| --- | --- |
| 148 | toe web portion |
| 150 | heel web portion |
| 152 | angle |
| 154 | angle |
| 156 | angle |
| 158 | angle |
| 160 | contact surface |
| 162 | curvature |
| 164 | mid-height |
| 166 | relative radius of curvature section |
| 170 | involute section |
| 180 | contact surface |
| 182 | curvature |
| 184 | mid-height |
| 186 | relative radius of curvature section |
| 188 | relative radius of curvature section |
| 190 | involute section |
| 192 | path of action |
| 194 | pitch point |
| 196 | transition |
| 200 | parabolic shape |
| 202 | bottom |
| 204 | end |
| 206 | end |
| 210 | parabolic shape |
| 212 | bottom |
| 214 | end |
| 216 | end |
| 250 | forging process |
| 252 | control system |
| 254 | cutting program |
| 256 | forging die |
| 258 | forging die |
| 260 | cutting system |
| 260a | numerically controlled mill |
| 260b | numerically controlled mill |
| 262 | surfaces |
| 264 | surfaces |
| 300 | grain structure |
| 302 | lines |
| 304 | contours |
| 320 | grain structure |
| 322 | lines |
| 324 | contours |
| 400 | method |
| 402 | box |
| 404 | box |
| 406 | box |
| 408 | box |
| 410 | box |
| 412 | box |
| 414 | box |
| 416 | box |
| 450 | method |
| 452 | box |
| 454 | box |
| 456 | box |
| 458 | box |
| 460 | box |

The terminology used herein is for the purpose of describing particular example aspects of the present teachings only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The methods, processes, and operations described herein are not to be construed as necessarily requiring their performance in the particular order discussed or illustrated, unless specifically identified as an order of performance. It is also to be understood that additional or alternative methods, processes, and operations may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first" and "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner" and "outer," "beneath" and "below," "lower," "above" and "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the aspects of the present teachings has been provided for purposes of illustration and description and is not intended to be exhaustive or to limit the present teachings. Individual elements or features of a particular aspect are generally not limited to that particular aspect, but, where applicable, are interchangeable and can be used in one or more selected aspects, even if not specifically shown or described. The same may also be varied in many ways. Such variations are not to be regarded as a departure from the present teachings, and all such modifications are intended to be included within the scope of the present teachings.

What is claimed is:

1. Mating bevel gears comprising:
a pinion gear having a body that rotates about a first axis, the pinon gear having a plurality of pinion gear teeth having sides that are formed with a curvature, wherein the curvature on the pinion gear teeth is formed to include a first involute section contained within a first controlled relative radius of curvature section, wherein the first controlled relative radius of curvature section that is not included in the first involute section is defined by a first radius of curvature, wherein the first radius of curvature has a minimum value at a first location that is closest to a pitch line of the pinion gear teeth, wherein the first radius of curvature has a value that increases with increasing distance from the first location where the first radius of curvature has its minimum value, wherein the first radius of curvature provides gear teeth formed with a pinion dedendum below the pitch line of the pinion gear teeth and a pinion addendum above the pitch line of the pinion gear teeth, wherein an exterior surface of the pinion dedendum is convex in shape, wherein an exterior surface of the pinion addendum is convex in shape, and wherein the exterior surfaces of the pinion dedundum and addendum are separated by the first involute section, wherein the first involute section is defined by a second radius of curvature, wherein the second radius of curvature has a minimum value that is closest to a bottom land of the pinion gear teeth and wherein a value of the second radius of curvature increases with increasing distance away from the bottom land of the pinion gear teeth;
a side gear having a body that rotates about a second axis that is perpendicular to the first axis, the side gear having a plurality of side gear teeth that are meshed with the pinion gear teeth, the side gear teeth having sides that are formed with a curvature, wherein the curvature on the side gear teeth is formed to include a second involute section contained within a second controlled relative radius of curvature section, wherein the second controlled relative radius of curvature section that is not included in the second involute section is defined by a third radius of curvature, wherein the third radius of curvature has a minimum value of radius of curvature at a second location that is closest to a pitch line of the side gear teeth, wherein the third radius of curvature has a value that increases from the minimum value at the second location with increasing distance away from the second location where the second radius of curvature has its minimum value, wherein the third radius of curvature provides gear teeth formed with a side gear dedendum below the pitch line of the side gear teeth and a side gear addendum above the pitch line of the side gear teeth, wherein an exterior surface of the side gear dedendum is convex in shape, wherein an exterior surface of the side gear addendum is convex in shape, and wherein the exterior surfaces of the side gear dedundum and addendum are separated by the second involute section, wherein the second involute section is defined by a fourth radius of curvature, wherein the fourth radius of curvature has a minimum value of radius of curvature at a location that is closest to a bottom land of the side gear teeth, and wherein a value of the fourth radius of curvature increases with increasing distance away from the bottom land of the side gear teeth.

2. The mating bevel gears of claim 1, wherein at least one of each of the pinion gear teeth and each of the side gear teeth include a toe portion and a heel portion that each include a contoured edge configured to provide a shorter distance between the toe portion and the heel portion near a top land relative to a distance between the toe portion and the heel portion but near a bottom land.

3. The mating bevel gears of claim 1, wherein the pinion gear and the side gear each have lines of a grain structure that extend through and are uninterrupted in the pinion gear teeth and the side gear teeth.

4. The mating bevel gears of claim 1, wherein the pinion gear teeth define a mid-height that is between the pitch line and a top land of the pinion gear teeth and the involute section is at least disposed between the pitch line and the mid-height of the pinion gear teeth.

5. The mating bevel gears of claim 1, wherein the pitch line is between a top land and a mid-height of the side gear teeth and the involute section is disposed at least between the pitch line and the mid-height of the side gear teeth.

6. The mating bevel gears of claim 1, wherein the curvature of the contact surface on the pinion gear teeth within the controlled relative radius of curvature section defines a minimum value of radius of curvature closest to the pitch line of the pinion gear teeth and an increasing value of radius of curvature toward the top land and toward the bottom land of the pinion gear teeth and within the involute section the curvature on the pinion gear teeth defines a minimum value of radius of curvature closest to the bottom land relative to an increasing value of radius of curvature toward the top land.

7. The bevel gears of claim 1, wherein the curvature of the contact surface on the side gear teeth within the controlled relative radius of curvature section defines a minimum value of radius of curvature closest to the pitch line of the side gear teeth and an increasing value of radius of curvature toward the top land and toward the bottom land of the side gear teeth and within the involute section the curvature on the side gear teeth defines a minimum value of radius of curvature closest to the bottom land relative to an increasing value of radius of curvature toward the top land.

8. A method of fabricating forging dies to forge mating bevel gears, the method comprising:
cutting multiple surfaces of a first forging die, the multiple surfaces of the first forging die cooperating to define a first cavity that is configured to form a pinion gear that is rotatable about a first axis, the pinion gear having a plurality of pinion gear teeth that are formed with a curvature on each of the sides of the pinion gear teeth wherein the curvature on the pinion gear teeth is formed to include a first involute section contained within a first controlled relative radius of curvature section, wherein the first controlled relative radius of curvature section that is not included in the first involute section is defined by a first radius of curvature, wherein the first radius of curvature has a minimum value at a first location that is closest to a pitch line of the pinion gear teeth, wherein the first radius of curvature has a value that increases with increasing distance from the first location where the first radius of curvature has its minimum value, wherein the first radius of curvature provides gear teeth formed with a pinion dedendum below the pitch line of the pinion gear teeth and a pinion addendum above the pitch line of the pinion gear teeth, wherein an exterior surface of the pinion dedendum is convex in shape, wherein an exterior surface of the pinion addendum is convex in shape, and wherein the exterior surfaces of the pinion dedundum and addendum are separated by the first involute section, wherein the first involute section is defined by a second radius of curvature, wherein the second radius of curvature has a minimum value that is closest to a bottom land of the pinion gear teeth and wherein a value of the second radius of curvature increases with increasing distance away from the bottom land of the pinion gear teeth; and
cutting multiple surfaces of a second forging die, the multiple surfaces of the second forging die cooperating to form a second cavity that is configured to form a side gear that is rotatable about a second axis that is perpendicular to the first axis, the side gear having a plurality of side gear teeth that are configured to mesh with the pinion gear teeth, the side gear teeth being formed with a curvature on each of the sides of the side gear teeth, wherein the curvature on the side gear teeth is formed to include a second involute section contained within a second controlled relative radius of curvature section, wherein the second controlled relative radius of curvature section that is not included in the second involute section is defined by a third radius of curvature, wherein the third radius of curvature has a minimum value of radius of curvature at a second location that is closest to a pitch line of the side gear teeth, wherein the third radius of curvature has a value that increases from the minimum value at the second location with increasing distance away from the second location where the second radius of curvature has its minimum value, wherein the third radius of curvature provides gear teeth formed with a side gear dedendum below the pitch line of the side gear teeth and a side gear addendum above the pitch line of the side gear teeth, wherein an exterior surface of the side gear dedendum is convex in shape, wherein an exterior surface of the side gear addendum is convex in shape, and wherein the exterior surfaces of the side gear dedundum and addendum are separated by the second involute section, wherein the second involute section is defined by a fourth radius of curvature, wherein the fourth radius of curvature has a minimum value of radius of curvature at a location that is closest to a bottom land of the side gear teeth, and wherein a value of the fourth radius of curvature increases with increasing distance away from the bottom land of the side gear teeth.

9. The method of claim 8 wherein the bottom lands of the pinion gear teeth are defined by parabolic shapes formed on the multiple surfaces of the first forging die.

10. The method of claim 8 wherein the bottom lands of the side gear teeth are defined by parabolic shapes formed on the multiple surfaces of the second forging die.

11. The method claim 8, wherein the pinion gear teeth define a mid-height that is between the pitch line of the pinion gear teeth and a top land of the pinion gear teeth and the first involute section is at least disposed between the pitch line of the pinion gear teeth and the mid-height of the pinion gear teeth.

12. The method of claim 8, wherein the pitch line of the side gear teeth is between a top land of the side gear teeth and a mid-height of the side gear teeth and the second involute section is disposed at least between the pitch line of the side gear teeth and the mid-height of the side gear teeth.

13. Mating bevel gears comprising:
a pinion gear having a body that rotates about an axis;
a side gear having a body that rotates about an axis that intersects the axis of the pinion gear;
the pinion gear having a plurality of pinion gear teeth, the pinion gear teeth having a side that defines a curvature with an involute section through which a pitch line extends and a parabolic shape between adjacent pairs of the pinion gear teeth; and the side gear having side gear teeth, the side gear teeth having a side defining a curvature with an involute section through which a pitch line extends and a parabolic shape between adjacent pairs of the side gear teeth, wherein the curvatures on the pinion gear teeth and the side gear teeth cooperatively define a controlled relative radius of curvature section except where the involute sections are located, wherein portions of each of the curvatures on the pinion gear teeth and the side gear teeth that are in the controlled relative radius of curvature section are varied in a predetermined manner and are not constant, the controlled relative radius of curvature section defines a sum of values of radius of curvature at a point of contact between the curvatures of the pinion gear teeth and the side gear teeth, the sum having a constant or decreasing value.

14. The mating bevel gears of claim 13, wherein at least one of each of the pinion gear teeth and each of the side gear teeth include a toe portion and a heel portion that each include a contoured edge configured to provide a shorter distance between the toe portion and the heel portion near a top land relative to a distance between the toe portion and the heel portion but near a bottom land.

15. The mating bevel gears of claim 13, wherein the pinion gear and the side gear each have lines of a grain structure that extend through and are uninterrupted in the pinion gear teeth and the side gear teeth.

16. The mating bevel gears of claim 13, wherein the pinion gear teeth define a mid-height that is between the pitch line and a top land of the pinion gear teeth and the involute section is at least disposed between the pitch line and the mid-height of the pinion gear teeth.

17. The mating bevel gears of claim 13, wherein the pitch line is between a top land and a mid-height of the side gear teeth and the involute section is disposed at least between the pitch line and the mid-height of the side gear teeth.

18. The mating bevel gears of claim 13, wherein the curvature of the contact surface on the pinion gear teeth within the controlled relative radius of curvature section defines a minimum value of radius of curvature closest to the pitch line of the pinion gear teeth and an increasing value of radius of curvature toward the top land and toward the bottom land of the pinion gear teeth and within the involute section the curvature on the pinion gear teeth defines a minimum value of radius of curvature closest to the bottom land relative to an increasing value of radius of curvature toward the top land.

19. The mating bevel gears of claim 13, wherein the curvature of the contact surface on the side gear teeth within the controlled relative radius of curvature section defines a minimum value of radius of curvature closest to the pitch line of the side gear teeth and an increasing value of radius of curvature toward the top land and toward the bottom land of the side gear teeth and within the involute section the curvature on the side gear teeth defines a minimum value of radius of curvature closest to the bottom land relative to an increasing value of radius of curvature toward the top land.

20. The method of claim 8, further comprising:
forming the pinion gear in the first forging die;
forming the side gear in the second forging die;
mounting the pinion gear for rotation about a first axis; and
mounting the side gear for rotation about a second axis that is perpendicular to the first axis such that the side gear teeth are meshed with the pinion gear teeth.

* * * * *

UNITED STATES PATENT AND TRADEMARK OFFICE
CERTIFICATE OF CORRECTION

PATENT NO. : 10,161,495 B2
APPLICATION NO. : 15/044159
DATED : December 25, 2018
INVENTOR(S) : Dale K. Benedict et al.

Page 1 of 1

It is certified that error appears in the above-identified patent and that said Letters Patent is hereby corrected as shown below:

In the Claims

In Column 13, in Line 62 of Claim 1, delete "pinon", and insert --pinion-- therefor.

In Column 16, in Line 48 of Claim 11, after "method", insert --of-- therefor.

Signed and Sealed this
Ninth Day of April, 2019

Andrei Iancu
*Director of the United States Patent and Trademark Office*